No. 642,153. Patented Jan. 30, 1900.
C. N. PERKINS.
HOSE NOZZLE.
(Application filed Feb. 5, 1898.)

(No Model.)

Witnesses:
Walter E. Lombard.
Fred S. Greenleaf.

Inventor:
Charles N. Perkins;
by Crosby Gregory, Attys.

UNITED STATES PATENT OFFICE.

CHARLES N. PERKINS, OF LAWRENCE, MASSACHUSETTS.

HOSE-NOZZLE.

SPECIFICATION forming part of Letters Patent No. 642,153, dated January 30, 1900.

Application filed February 5, 1898. Serial No. 669,175. (No model.)

*To all whom it may concern:*

Be it known that I, CHARLES N. PERKINS, of Lawrence, county of Essex, State of Massachusetts, have invented an Improvement in Hose-Nozzles, of which the following description, in connection with the accompanying drawings, is a specification, like letters on the drawings representing like parts.

This invention has for its object to provide means for readily lubricating the plug or way of the nozzle, the rotation of which plug in one or the other direction cuts off or lets on the supply of water.

In this invention the pipe has a plug having not only a waterway, but a series of passages to receive oil by which to lubricate the contacting face of the plug with the pipe, the oil inserted for lubricating the plug being passed through hollow screws carried by the plug, said screws having suitable oil-delivery passages and valves to automatically keep them closed, so that the oil put in the hollow screws cannot escape therefrom, but will at the proper times enter the oil-passages of the plug.

Figure 1:
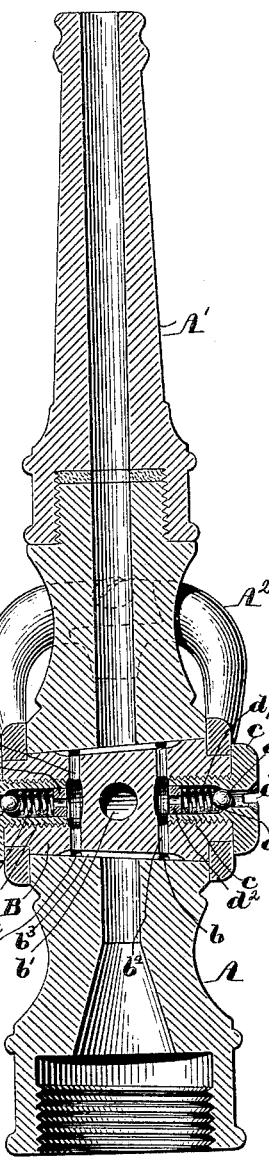
Figure 2:
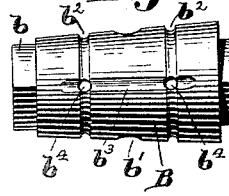
Figure 3:
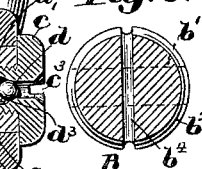
Figure 4:
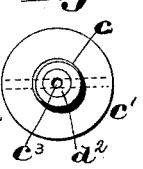

Figure 1 represents in vertical section a hose-pipe and its plug or cut-off to control the flow of water. Fig. 2 shows the plug detached. Fig. 3 is a section taken through the plug, and Fig. 4 is an enlarged end view.

The body A of the nozzle and its extension A', screwed thereto, and the handle or lever $A^2$, secured to the ends of the plug in order to rotate it to let on or cut off the water, are and may be all as common in hose-nozzles.

The plug B (shown detached in Fig. 2) has at its end squared portions $b$, over which fit the squared openings in the end of the lever $A^2$; but this plug besides its usual waterway $b'$ has annular grooves $b^2$ and longitudinal grooves $b^3$, intersecting said annular grooves, and the bottom of the longitudinal grooves $b^3$ are connected from one to the other side of the plug by means of holes $b^4$, said holes being open in the bottoms of the grooves $b^2$. The plug has its opposite end tapped and threaded, as shown at $c$, for the reception of the headed screws $c'$, (see Fig. 1,) said screws being hollow to form oil-chambers, the chambers in the screws presenting seats $d^3$, with which coöperate suitable balls or other devices $d$, which constitute valves by which to normally close the open outer ends $c^3$ of the screw and prevent the escape of oil placed in said screws from their outer ends. Each screw has an oil-delivery passage, through which the oil put into the recess of the screw may pass out into the grooves $b^4 b^3 b^2$ of the plug. The oil-delivery passage $d^x$ of each screw is herein shown as made in a washer $d^2$, forced into the inner end of the recess of the screw, each of said washers supporting a spring $d'$, which acts against one of the balls or valves $d$, referred to, and keeps it in a yielding manner upon the seat $d^3$. After applying the handle $A^2$ to the squared end of the plug the screws are turned into the threaded holes of the plug, and the heads of the screws thereafter act to retain the handle in correct position on the plug.

To oil the surface of the plug where it contacts with the pipe, and thereby prevent any possibility of the same sticking by corrosion or otherwise, it is only necessary to insert the snout of an oil-can into the hole $c^3$ at the end of the screw far enough to push back the ball, when the oil from the can will readily enter the hollow screw and pass therefrom through the opening in the washer $d^2$ in the holes $b^4$ and outwardly from said holes $b^4$ into the grooves $b^2$ and $b^3$. In this way oil is effectually supplied to the surface of the plug near both ends without removing the plug or without providing the pipe with oil-ducts, and the oil-ducts in the screw are always kept closed against the entrance of dust or the escape of oil therefrom by means of the balls $d$.

Having fully described my invention, what I claim as new, and desire to secure by Letters Patent, is—

1. The combination with a pipe, of a plug supported thereby and having a waterway and also having an oil-passage, of an operating device for the plug, and means for connecting the operating device to the plug, said means including a device having an oil-passage in communication with the oil-passage of the plug.

2. A hose-nozzle having a plug provided with a waterway and having oil-passages therein, and a hollow screw screwed into the end of said plug and in communication with the oil grooves or ways of said plug, combined with a ball and spring to normally act upon said ball and keep it seated in the passage in said screw to exclude dust and dirt, said ball being readily moved inwardly by the nose of an oil-can to enable oil to be admitted in the said hollow screw and pass therefrom into the exterior of said plug, substantially as described.

3. A hose-pipe having a plug provided with a waterway and with external oil-grooves, and a handle applied to the opposite ends of said plug, combined with hollow screws inserted into the opposite ends of said plug, the interior of said hollow screws being shaped to present seats, a washer inserted in each of said screws, an oil-delivery passage, and a valve, and means to normally keep the said valve closed against the seats at the interior of said screws, substantially as described.

4. The combination with a pipe, of a plug supported thereby and having a waterway and also having an oil-passage, an operating device for the plug, and means for connecting the operating device to the plug, said means including a bored screw in threaded engagement with the plug, and the bore being in communication with said oil-passage.

5. The combination with a pipe, of a plug supported thereby and having an oil-passage, a lever having flanges united to the opposite ends of the plug, screws seated in said opposite ends and adapted to secure the lever in place, and each having bores communicating with said oil-passage, valves disposed in said bores, and means acting against the valves to normally hold them closed.

In testimony whereof I have signed my name to this specification in the presence of two subscribing witnesses.

CHARLES N. PERKINS.

Witnesses:
JOHN C. EDWARDS,
AUGUSTA E. DEAN.